US011308449B2

(12) United States Patent
Meisels et al.

(10) Patent No.: US 11,308,449 B2
(45) Date of Patent: Apr. 19, 2022

(54) STORING METADATA INSIDE FILE TO REFERENCE SHARED VERSION OF FILE

(75) Inventors: Joshua Adam Meisels, Seattle, WA (US); Daniel Paul Costenaro, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/096,899

(22) Filed: Apr. 28, 2011

(65) Prior Publication Data

US 2012/0278281 A1 Nov. 1, 2012

(51) Int. Cl.
*G06F 16/182* (2019.01)
*G06Q 10/10* (2012.01)

(52) U.S. Cl.
CPC ......... *G06Q 10/107* (2013.01); *G06F 16/182* (2019.01)

(58) Field of Classification Search
CPC .............................. G06F 16/182; G06Q 10/107
USPC ........................... 707/610, 619, 633, 999.104
See application file for complete search history.

(56) References Cited

U.S. PATENT DOCUMENTS

| 5,355,472 | A | 10/1994 | Lewis | |
|---|---|---|---|---|
| 5,787,480 | A | 7/1998 | Scales et al. | |
| 5,864,870 | A | 1/1999 | Guck | |
| 5,903,723 | A | 5/1999 | Beck | 709/200 |
| 6,219,818 | B1 | 4/2001 | Freivald et al. | 714/799 |
| 6,275,848 | B1 | 8/2001 | Arnold | |
| 6,275,850 | B1 | 8/2001 | Beyda | 709/206 |
| 6,314,425 | B1 | 11/2001 | Serbinis et al. | |
| 6,397,261 | B1 | 5/2002 | Erldridge et al. | |
| 6,401,093 | B1 * | 6/2002 | Anand | G06F 16/172 707/E17.007 |
| 6,405,225 | B1 | 6/2002 | Apfel et al. | |
| 6,493,758 | B1 | 12/2002 | McLain | 709/227 |
| 6,533,822 | B2 | 3/2003 | Kupiec | 715/253 |
| 6,687,741 | B1 * | 2/2004 | Ramaley et al. | 709/206 |

(Continued)

FOREIGN PATENT DOCUMENTS

| CN | 1449525 A | 10/2003 |
|---|---|---|
| CN | 1749998 A | 3/2006 |

(Continued)

OTHER PUBLICATIONS

Decouchant et al.; "Griffon: A Cooperative, Structured, Distributed Document Editor"; 1993; http://citeseerx.ist.psu.edu/viewdoc/download?doi=10.1.1.51.759&rep=rep1&type=pdf; 28 pages.

(Continued)

*Primary Examiner* — Kannan Shanmugasundaram
(74) *Attorney, Agent, or Firm* — Liang IP, PLLC

(57) ABSTRACT

A link to a shared version of a local file is inserted into metadata of the local file. The local file may be a copy of a shared file and/or a local file that is designated to be shared. For example, when a local file is uploaded to a shared location for collaboration, a link to the shared location is automatically inserted into metadata of the local file. A local copy of a shared file may be created by downloading the shared file to a local data store. A link to the shared location is automatically inserted into the locally stored. When the local file is opened, the link within the metadata may be used to access the version of the local file at the shared location. Changes made to the local file and/or shared version of the file may also be synchronized.

20 Claims, 7 Drawing Sheets

(56) References Cited

U.S. PATENT DOCUMENTS

| | | |
|---|---|---|
| 6,718,368 B1 | 4/2004 | Ayyadurai |
| 6,763,496 B1 | 7/2004 | Hennings et al. |
| 6,782,423 B1 | 8/2004 | Nakayama et al. |
| 6,839,741 B1 | 1/2005 | Tsai |
| 6,883,009 B2 * | 4/2005 | Yoo |
| 6,948,131 B1 | 9/2005 | Neven et al. |
| 6,954,934 B2 | 10/2005 | Kumar |
| 6,978,276 B2 | 12/2005 | Demsky et al. |
| 7,003,551 B2 | 2/2006 | Malik |
| 7,028,075 B2 | 4/2006 | Morris ............... 709/206 |
| 7,054,905 B1 | 5/2006 | Hanna et al. |
| 7,089,287 B2 | 8/2006 | Bellotti et al. |
| 7,107,518 B2 | 9/2006 | Ramaley et al. ............. 715/235 |
| 7,113,948 B2 | 9/2006 | Jhingan et al. |
| 7,127,670 B2 | 10/2006 | Bendik ............... 715/200 |
| 7,130,885 B2 | 10/2006 | Chandra et al. |
| 7,143,091 B2 | 11/2006 | Charnock et al. |
| 7,178,099 B2 | 2/2007 | Meyer et al. ............... 715/210 |
| 7,194,514 B1 | 3/2007 | Yen et al. ............... 709/206 |
| 7,290,034 B2 | 10/2007 | Budd et al. ............... 709/206 |
| 7,353,232 B1 | 4/2008 | Kalucha et al. |
| 7,392,280 B2 | 6/2008 | Rohall et al. ............... 709/201 |
| 7,401,291 B2 | 7/2008 | Ramaley et al. |
| 7,409,394 B2 | 8/2008 | Lee |
| 7,409,424 B2 | 8/2008 | Parker ............... 709/206 |
| 7,424,543 B2 | 9/2008 | Rice, III |
| 7,424,676 B1 | 9/2008 | Carlson et al. |
| 7,444,382 B2 | 10/2008 | Malik |
| 7,509,386 B2 | 3/2009 | Miyashita |
| 7,536,440 B2 | 5/2009 | Budd et al. |
| 7,546,352 B1 | 6/2009 | Sukadev et al. |
| 7,565,409 B2 | 7/2009 | Heilbron et al. |
| 7,580,982 B2 | 8/2009 | Owen et al. |
| 7,593,943 B2 * | 9/2009 | Clarke et al. |
| 7,650,387 B2 | 1/2010 | Foo ............... 709/214 |
| 7,730,082 B2 | 6/2010 | Sah et al. ............... 707/770 |
| 7,752,269 B2 | 7/2010 | Chan et al. |
| 7,783,711 B2 | 8/2010 | LeVasseur et al. |
| 7,783,972 B2 | 8/2010 | Camps et al. ............... 715/255 |
| 7,814,425 B1 | 10/2010 | O'Shaugnessy et al. |
| 7,840,642 B2 | 11/2010 | Naick et al. |
| 7,908,332 B2 | 3/2011 | Malik |
| 7,917,591 B2 | 3/2011 | Vakkalanka |
| 7,966,375 B2 | 6/2011 | Steele |
| 7,970,850 B1 * | 6/2011 | Callanan ............... H04L 51/046 709/206 |
| 8,108,464 B1 | 1/2012 | Rochelle et al. |
| 8,140,975 B2 | 3/2012 | Lemay et al. |
| 8,145,707 B2 | 3/2012 | Thayer et al. |
| 8,176,123 B1 * | 5/2012 | Wang et al. ............... 709/204 |
| 8,185,591 B1 | 5/2012 | Lewis |
| 8,196,029 B1 | 6/2012 | Rucker et al. |
| 8,458,269 B2 | 6/2013 | Friedman et al. |
| 8,682,989 B2 * | 3/2014 | Meisels et al. ............... 709/206 |
| 8,965,983 B2 | 2/2015 | Costenaro et al. |
| 9,137,185 B2 | 9/2015 | Costenaro et al. |
| 9,165,285 B2 | 10/2015 | Schultz et al. |
| 2001/0051991 A1 | 12/2001 | Beyda et al. |
| 2001/0054073 A1 | 12/2001 | Ruppert et al. |
| 2002/0016818 A1 | 2/2002 | Kirani et al. |
| 2002/0059384 A1 | 5/2002 | Kaars |
| 2002/0062356 A1 | 5/2002 | Clarke et al. |
| 2002/0065892 A1 * | 5/2002 | Malik ............... G06Q 10/107 707/999.01 |
| 2002/0107931 A1 | 8/2002 | Singh et al. |
| 2002/0129056 A1 | 9/2002 | Conant et al. |
| 2002/0133633 A1 | 9/2002 | Kumar |
| 2002/0138586 A1 | 9/2002 | Paleiov et al. |
| 2002/0143691 A1 | 10/2002 | Ramaley et al. |
| 2002/0174010 A1 | 11/2002 | Rice |
| 2003/0028528 A1 | 2/2003 | Christensen et al. |
| 2003/0028600 A1 | 2/2003 | Parker |
| 2003/0055907 A1 | 3/2003 | Stiers ............... 709/206 |
| 2003/0112273 A1 | 6/2003 | Hadfield et al. |
| 2003/0131062 A1 | 7/2003 | Miyashita |
| 2004/0034688 A1 | 2/2004 | Dunn |
| 2004/0068545 A1 | 4/2004 | Daniell et al. |
| 2004/0103044 A1 | 5/2004 | Vandewater et al. ......... 705/26.1 |
| 2004/0158586 A1 * | 8/2004 | Tsai ............... G06Q 10/10 |
| 2004/0158607 A1 | 8/2004 | Coppinger et al. ............ 709/206 |
| 2004/0186894 A1 | 9/2004 | Jhingan et al. ............... 709/207 |
| 2004/0243672 A1 * | 12/2004 | Markki et al. ............... 709/204 |
| 2004/0261082 A1 | 12/2004 | Steere et al. |
| 2005/0010799 A1 | 1/2005 | Kelley et al. |
| 2005/0033813 A1 | 2/2005 | Bhogal et al. |
| 2005/0044492 A1 | 2/2005 | Ramaley et al. |
| 2005/0060382 A1 | 3/2005 | Spector ............... 709/213 |
| 2005/0091289 A1 * | 4/2005 | Shappell ............... G06F 16/10 707/999.201 |
| 2005/0114672 A1 | 5/2005 | Duncan et al. |
| 2005/0122345 A1 | 6/2005 | Kim et al. |
| 2005/0166154 A1 | 7/2005 | Wilson ............... 715/751 |
| 2005/0188026 A1 | 8/2005 | Hilbert et al. ............... 709/206 |
| 2005/0251443 A1 | 11/2005 | Chan ............... 705/14.721 |
| 2005/0289221 A1 | 12/2005 | Steele |
| 2006/0004819 A1 | 1/2006 | Claudatos et al. |
| 2006/0020673 A1 | 1/2006 | Sorge et al. |
| 2006/0031309 A1 | 2/2006 | Luoffo et al. ............... 709/206 |
| 2006/0075046 A1 | 4/2006 | Yozell-Epstein et al. |
| 2006/0095527 A1 | 5/2006 | Malik |
| 2006/0161516 A1 | 7/2006 | Clarke et al. |
| 2006/0195526 A1 | 8/2006 | Lederer ............... 709/206 |
| 2006/0206570 A1 | 9/2006 | Heidloff et al. ............... 709/206 |
| 2006/0224679 A1 | 10/2006 | Kikuchi et al. |
| 2006/0242208 A1 | 10/2006 | Goldick |
| 2006/0259524 A1 | 11/2006 | Horton |
| 2006/0282762 A1 | 12/2006 | Diamond et al. ............ 715/235 |
| 2006/0294455 A1 | 12/2006 | Morris et al. |
| 2007/0005717 A1 | 1/2007 | Thierry et al. |
| 2007/0022166 A1 | 1/2007 | Bhogal et al. ............... 709/206 |
| 2007/0118598 A1 | 5/2007 | Bedi et al. |
| 2007/0118794 A1 | 5/2007 | Hollander et al. |
| 2007/0130259 A1 | 6/2007 | Daniell et al. |
| 2007/0136814 A1 * | 6/2007 | Lee et al. ............... 726/25 |
| 2007/0143419 A1 | 6/2007 | Plas ............... 709/206 |
| 2007/0143425 A1 | 6/2007 | Kieselbach et al. ......... 709/206 |
| 2007/0168459 A1 | 7/2007 | Fujita et al. |
| 2007/0192490 A1 | 8/2007 | Minhas |
| 2007/0198657 A1 * | 8/2007 | Saliba ............... G06F 16/1767 709/219 |
| 2007/0198913 A1 | 8/2007 | Terao et al. |
| 2007/0208782 A1 | 9/2007 | Carter et al. |
| 2007/0233764 A1 | 10/2007 | Reznik et al. |
| 2007/0233794 A1 | 10/2007 | Singh |
| 2007/0271344 A1 * | 11/2007 | Danasekaran ......... G06Q 10/10 709/206 |
| 2007/0271502 A1 | 11/2007 | Bedi et al. |
| 2007/0283267 A1 | 12/2007 | Jeffrey et al. |
| 2008/0005139 A1 | 1/2008 | Hysom et al. |
| 2008/0028017 A1 | 1/2008 | Garbow et al. |
| 2008/0059539 A1 | 3/2008 | Chin et al. |
| 2008/0120382 A1 | 5/2008 | Heidloff et al. |
| 2008/0244721 A1 * | 10/2008 | Barrus ............... G06F 21/6254 726/9 |
| 2008/0250474 A1 | 10/2008 | Bhogal et al. |
| 2008/0256458 A1 | 10/2008 | Aldred et al. |
| 2008/0281924 A1 | 11/2008 | Gadwale ............... 709/206 |
| 2008/0282159 A1 | 11/2008 | Vanderwende et al. ...... 715/700 |
| 2008/0288862 A1 | 11/2008 | Smetters et al. |
| 2009/0006948 A1 | 1/2009 | Parker et al. |
| 2009/0024931 A1 * | 1/2009 | Bae ............... 715/748 |
| 2009/0030919 A1 | 1/2009 | Brezina et al. |
| 2009/0030997 A1 | 1/2009 | Malik |
| 2009/0031245 A1 | 1/2009 | Brezina et al. |
| 2009/0063520 A1 | 3/2009 | Kimura |
| 2009/0094514 A1 | 4/2009 | Dargahl et al. |
| 2009/0100109 A1 | 4/2009 | Turski et al. |
| 2009/0157831 A1 | 6/2009 | Tian et al. ............... 709/206 |
| 2009/0187852 A1 | 7/2009 | Tsurata |
| 2009/0210721 A1 | 8/2009 | Phillips |
| 2009/0248808 A1 | 10/2009 | Izumi ............... 709/206 |
| 2009/0313256 A1 | 12/2009 | Konduri et al. |
| 2009/0319618 A1 | 12/2009 | Affronti et al. ............... 709/206 |
| 2010/0011032 A1 | 1/2010 | Fukuoka |

(56) References Cited

U.S. PATENT DOCUMENTS

| | | | |
|---|---|---|---|
| 2010/0017701 A1 | 1/2010 | Bargeron et al. | 715/230 |
| 2010/0023492 A1 | 1/2010 | Lucas | |
| 2010/0057765 A1 | 3/2010 | Dispensa et al. | 707/102 |
| 2010/0057864 A1 | 3/2010 | Laird-McConnell | |
| 2010/0057872 A1 | 3/2010 | Koons et al. | |
| 2010/0070448 A1 | 3/2010 | Omoigui | |
| 2010/0070588 A1 | 3/2010 | Sinn et al. | |
| 2010/0076989 A1 | 3/2010 | Jakobson | |
| 2010/0082713 A1 | 4/2010 | Frid-Nielsen et al. | 707/821 |
| 2010/0095198 A1 | 4/2010 | Bultrowicz et al. | 715/234 |
| 2010/0100566 A1 | 4/2010 | Hronopoulos | |
| 2010/0106551 A1 | 4/2010 | Koskimies et al. | |
| 2010/0125640 A1 | 5/2010 | Boddington et al. | |
| 2010/0169295 A1 | 7/2010 | Kanamori | |
| 2010/0169439 A1 | 7/2010 | O'Sullivan et al. | |
| 2010/0169440 A1 | 7/2010 | O'Sullivan | 709/206 |
| 2010/0191774 A1 | 7/2010 | Mason et al. | |
| 2010/0198927 A1 | 8/2010 | Tonnison et al. | 709/206 |
| 2010/0228611 A1 | 9/2010 | Shenfield | |
| 2010/0228989 A1* | 9/2010 | Neystadt et al. | 713/185 |
| 2010/0235763 A1 | 9/2010 | Massand | |
| 2010/0273456 A1 | 10/2010 | Wolovitz et al. | |
| 2010/0281224 A1 | 11/2010 | Ho et al. | |
| 2010/0306180 A1 | 12/2010 | Johnson et al. | |
| 2010/0306330 A1 | 12/2010 | Friedman | 709/206 |
| 2011/0055177 A1* | 3/2011 | Chakra et al. | 707/695 |
| 2011/0065419 A1 | 3/2011 | Book | |
| 2011/0066955 A1 | 3/2011 | Olson et al. | |
| 2011/0099380 A1 | 4/2011 | Vandewater | |
| 2011/0113104 A1 | 5/2011 | Bhogal et al. | |
| 2011/0119593 A1 | 5/2011 | Jacobson et al. | |
| 2011/0145363 A1* | 6/2011 | Ananthanarayanan et al. | 709/218 |
| 2011/0161430 A1 | 6/2011 | Callanan et al. | |
| 2011/0161435 A1 | 6/2011 | Mancuso | |
| 2011/0276897 A1 | 11/2011 | Crevier et al. | |
| 2011/0295959 A1 | 12/2011 | Martin et al. | |
| 2012/0117159 A1 | 5/2012 | Chakra et al. | |
| 2012/0095890 A1 | 6/2012 | Schultz et al. | |
| 2012/0151379 A1* | 6/2012 | Schultz | G06Q 10/10 715/752 |
| 2012/0192064 A1 | 7/2012 | Antebi et al. | |
| 2012/0278401 A1 | 11/2012 | Meisels et al. | |
| 2012/0278402 A1 | 11/2012 | Limont et al. | |
| 2012/0278403 A1 | 11/2012 | Costenaro et al. | |
| 2012/0278404 A1 | 11/2012 | Meisels et al. | |
| 2012/0278405 A1 | 11/2012 | Costenaro et al. | |
| 2012/0278407 A1 | 11/2012 | Meisels et al. | |
| 2012/0284344 A1 | 11/2012 | Costenaro et al. | |
| 2012/0284345 A1 | 11/2012 | Costenaro et al. | |
| 2014/0173423 A1 | 6/2014 | Meisels et al. | |
| 2016/0006832 A1 | 1/2016 | Costenaro et al. | |
| 2016/0043976 A1 | 2/2016 | Schultz et al. | |
| 2019/0138998 A1 | 5/2019 | Costenaro et al. | |

FOREIGN PATENT DOCUMENTS

| | | |
|---|---|---|
| CN | 1753400 A | 3/2006 |
| CN | 1795654 | 6/2006 |
| CN | 1831827 A | 9/2006 |
| CN | 1971553 A | 5/2007 |
| CN | 101009667 A | 8/2007 |
| CN | 101079846 A | 11/2007 |
| CN | 101655845 A | 2/2010 |
| CN | 101655870 | 2/2010 |
| EP | 933712 A2 | 8/1999 |
| JP | H05135056 A | 6/1993 |
| JP | 08235231 A | 9/1996 |
| JP | 10269236 A | 10/1998 |
| JP | 11161584 A | 6/1999 |
| JP | 11345182 A | 12/1999 |
| JP | 2001043151 A | 2/2001 |
| JP | 2001307006 A | 11/2001 |
| JP | 2002049615 | 2/2002 |
| JP | 2002091813 A | 3/2002 |
| JP | 2005011354 A | 1/2005 |
| JP | 2005025620 A | 1/2005 |
| JP | 2005084945 | 3/2005 |
| JP | 2005129061 A | 5/2005 |
| JP | 2007501969 | 2/2007 |
| JP | 2007213511 A | 8/2007 |
| JP | 2008-500646 | 1/2008 |
| KR | 20110003490 U | 4/2011 |
| RU | 2373653 | 11/2009 |
| WO | 2003052622 | 6/2003 |
| WO | 2005027404 A1 | 3/2005 |
| WO | 2007133504 | 11/2007 |
| WO | 2009023769 A1 | 2/2009 |
| WO | 2009158108 A2 | 12/2009 |
| WO | 2010041505 A1 | 4/2010 |
| WO | 2010104659 A2 | 9/2010 |

OTHER PUBLICATIONS

Devendorf, G.; "Outlook putting attachments in Sharepoint"; Feb. 13, 2008; http://my.advisor.com/blog/garydev.nsf/d6plinks/GDEF-7BSUA2; 5 pages.

Edholm, Y.; "Email Attachments: The Scourge of the Network"; Jul. 21, 2008; solutions-daily.com; http://www.solutions-daily.com/dsp_getFeaturesDetails.cfm?CID=691; 3 pg.s.

Egnyte.co; "Cloud File Server Features—Complete List"; accessed Dec. 30, 2010, at http://www.egnyte.co.uk/file-server/online-file-server-features.html; 5 pgs.

Gigaom.com; "*How to Use Adobe Acrobat for Online Document Reviews*"; Retrieved Date: Jan. 4, 2010; http://gigaom.com/collaboration/how-to-use-adobe-acrobat-for-online-document-reviews/; 8 pgs.

Harmoni.ie; "harmon.ie for SharePoint"; accessed Apr. 1, 2011 at http://harmon.ie/SharePoint/Product/Features/CollaborateUsingDocuments; 3 pgs.

Hsieh, H., et al.; "Activity Links: Supporting Communication and Reflection about Action"; Center for the Study of Digital Libraries and Dept. of Computer Science, Texas A&M University, USA; HT '05 Sep. 6-9, 2005, Salzburg, AT; 10 pgs.

Jatowt, A., et al.; "Change Summarization in Web Collections"; University of Tokyo, Japan; 2004; accessed on or about Jan. 4, 2010 at http://citeseerx.ist.psu.edu/viewdoc/download?doi=10.1.1.73.7999 &rep=rep1&type-pdf; 10 pgs.

Lenahan, T.; "5 New Google Docs Features You Might Have Missed"; Apr. 6, 2010; http://www.makeuseof.com/tag/5-google-docs-features-making/; 9 pgs.

Masternewmedia.org; "*Collaborative Document Review Online: PleaseReview*"; Retrieved Date: Jan. 4, 2010; http://www.masternewmedia.org/news/2005/06/02/collaborative_document_review_online_pleasereview.htm; 4 pgs.

Microsoft Support; "Attachment Manager for Outlook"; accessed Jan. 7, 2011, at http://assistmyteam.com/downloads/manuals/AttachmentManager.pdf; 14 pgs.

Microsoft Support; "OL2000: Changing from Local Delivery to Server and Offline"; Oct. 8, 2003, rev. 1.0; accessed Jan. 7, 2011 at http://support.microsoft.com/kb/197651; 4 pgs.

Microsoft Support; "You may receive an 'Outlook blocked access to the following potentially unsafe attachments' message in Outlook"; Last Review: May 13, 2010; http://support.microsoft.com/kb/829982; 7 pgs.

Microsoft; "*Going beyond e-mail: Collaborating with Office*"; Retrieved Date: Jan. 4, 2010; http://office.microsoft.com/en-us/outlook-help/going-beyond-e-mail-collaborating-with-office-HA001017429.aspx; 10 pgs.

Office-Addins.com; "Attachments Processor for Microsoft Outlook"; accessed Jan. 6, 2011, at http://www.-office-addins.com/-outlook-addins/attachments-processor.html; 3 pgs.

PhpBB—Free and Open Source Forum Software; "Display last edited time information"; accessed Jan. 6, 2011, at http://www.phpbb.com/community/viewtopic.php?f=46&t=589514; 7 pgs.

(56) References Cited

OTHER PUBLICATIONS

Redline-Software.com; "Outlook Connector for MDaemon"; accessed Jan. 6, 2011, at http://www.redline-software.com/eng/support/docs/mdaemon/c6s4.php; 7 pgs.
RSBR.de; "Outlook Attachment Sniffer"; accessed Jan. 6, 2011, at http://www.rsbr.de/Software/OASniffer/index.htm; 2 pgs.
Sharepoint Development; "How to show last modified workflow date in a column on the main list page"; Jul. 31, 2009—Aug. 4, 2009; accessed Jan. 6, 2011, at http://www.sharepointdev.net/sharepoint--design-customization/how-to-show-last-modified-workflow-date--in-a-column-on-the-main-list-page-5094.shtml; 4 pgs.
Thapa, S.; "Microsoft SharePoint 2010—Features and Benefits"; Dec. 1, 2010; EzineMark.com; 3 pgs.
McCoy, J., et al.; "*SharePoint Workspace and the Office Document Cache*"; Mar. 12, 2010-Sep. 29, 2010; retrieved Dec. 30, 2010, at http://blogs.msdn.com/b/sharepoint_workspace_development_team/archive/2010/03/12/sharepoint-workspace-and-the-office-document-cache.aspx; 2 pgs.
The Daily Reviewer; "*Outlook Shared Attachment as Hyperlink*", accessed Dec. 30, 2010, at http://thedailyreviewer.com/windowsapps/view/outlook-shared-attachment-as-hyperlink-11367085; 5 pgs.
PCT Search Report in PCT/US2012/035710 dated Sep. 28, 2012.
Office Action dated Nov. 13, 2012, issued in U.S. Appl. No. 13/096,910.
PCT Search Report in PCT/US2012/035707 dated Nov. 26, 2012.
PCT Search Report in PCT/US2012/035708 dated Nov. 26, 2012.
PCT Search Report in PCT/US2012/035709 dated Nov. 26, 2012.
PCT Search Report in PCT/US2012/036701 dated Nov. 28, 2012.
PCT Search Report in PCT/US2012/036702 dated Dec. 3, 2012.
Office Action dated Nov. 21, 2012, issued in U.S. Appl. No. 13/096,936.
Office Action dated Nov. 26, 2012, issued in U.S. Appl. No. 13/102,431.
Office Action dated Dec. 11, 2012, issued in U.S. Appl. No. 13/096,854.
Office Action dated Dec. 14, 2012, issued in U.S. Appl. No. 13/096,869.
Office Action dated Dec. 26, 2012, issued in U.S. Appl. No. 13/096,880.
Office Action dated Jan. 2, 2013, issued in U.S. Appl. No. 13/102,875.
Office Action dated Jan. 9, 2013, issued in U.S. Appl. No. 12/963,091.
Office Action dated Sep. 7, 2012, issued in U.S. Appl. No. 12/963,091.
Office Action dated Oct. 3, 2012, issued in U.S. Appl. No. 12/096,830.
Docstoc; "OneClick: Email Large Documents Without Attaching Files"; retrieved Jan. 7, 2011, from http://www.docstoc.com/oneclick/; 4 pgs.
Masternewmedia.com; "How to Send Large Files without Email"; Last updated: Jan. 6, 2011; retrieved Jan. 7, 2011, from http://www.masternewmedia.org/how_to_send_large_files_without_email/; 3 pgs.
MSDN.com; "How to Share Large Files Without Attaching Them"; Aug. 21, 2008; retrieved Jan. 7, 2011, from http://blogs.msdn.com/b/outlook/archive/2008/08/21/how-to-share-large-files-without-attaching-them.aspx; 3 pgs.
Sendthisfile.com; "Welcome to SendThisFile"; accessed Jan. 7, 2011, from http://www.sendthisfile.com/; 1 pg.
Office Action dated Jun. 4, 2013, issued in U.S. Appl. No. 13/096,936.
Office Action dated Jun. 10, 2013, issued in U.S. Appl. No. 13/102,431.
Office Action dated Jun. 11, 2013, issued in U.S. Appl. No. 13/096,910.
Office Action dated Jun. 20, 2013, issued in U.S. Appl. No. 13/096,854.
Office Action dated Jun. 21, 2013, issued in U.S. Appl. No. 13/096,830.
Office Action dated Jun. 21, 2013, issued in U.S. Appl. No. 13/096,869.
Office Action dated Jul. 16, 2013, issued in U.S. Appl. No. 13/096,880.
Office Action dated Nov. 22, 2013, issued in U.S. Appl. No. 13/102,875.
Office Action dated Jan. 15, 2014, issued in U.S. Appl. No. 13/096,854.
U.S. Appl. No. 14/188,666 entitled Making Document Changes by Replying to Electronic Messages, filed Feb. 24, 2014.
Office Action dated Jan. 31, 2014, issued in U.S. Appl. No. 13/096,869, 28 pgs.
Office Action dated Apr. 8, 2014, issued in U.S. Appl. No. 13/102,431, 16 pgs.
Office Action dated Jul. 10, 2014, issued in U.S. Appl. No. 13/096,869, 29 pgs.
Office Action dated Jul. 16, 2014, issued in U.S. Appl. No. 13/102,431, 20 pgs.
Office Action dated Aug. 14, 2014, issued in U.S. Appl. No. 13/096,854, 32 pgs.
Troost et al., Internet Engineering Task Force, RFC 2183 dated Aug. 1997, 12 pgs. available at: www.rfc-editor.org/rfc/rfc2183.txt.
EP Extended Search Report in PCT/US2012/035708 dated Aug. 29, 2014, 6 pgs.
EP Extended Search Report in PCT/US2012/035709 dated Sep. 22, 2014, 6 pgs.
EP Extended Search Report in PCT/US2012/035707 dated Oct. 21, 2014, 6 pgs.
EP Search Report in PCT/US2012/036701 dated Dec. 4, 2014, 5 pgs.
Office Action dated Sep. 25, 2014, issued in U.S. Appl. No. 12/963,091, 24 pgs.
Office Action dated Sep. 26, 2014, issued in U.S. Appl. No. 13/096,936, 29 pgs.
Office Action dated Oct. 6, 2014, issued in U.S. Appl. No. 13/096,880, 31 pgs.
Office Action dated Oct. 7, 2014, issued in U.S. Appl. No. 13/096,910, 32 pgs.
Notice of Allowance dated Oct. 14, 2014 issued in U.S. Appl. No. 13/102,431, 51 pgs.
Office Action dated Apr. 9, 2015, issued in U.S. Appl. No. 13/096,936, 23 pgs.
Office Action dated Apr. 20, 2015, issued in U.S. Appl. No. 13/096,880, 25 pgs.
Notice of Allowance dated Apr. 28, 2015, issued in U.S. Appl. No. 13/096,910, 23 pgs.
Wikipedia, Message, http://en.wikipedia.org/wikiIMessage retrieved Jan. 9, 2014, p. 1-2.
Office Action dated Jun. 16, 2014, issued in U.S. Appl. No. 12/963,091, 22 pgs.
EP Extended Search Report in PCT/US2012/036702 dated Aug. 12, 2014, 6 pgs.
Vogel et al., "Consistency Control for Synchronous and Asynchronous Collaboration Based on Shared Objects and Activities"; Computer Supported Copperative Work (CSCW); Kluwer Academic Publishers, vol. 13, No. 5-6; Dec. 1, 2004; pp. 573-602 (cited in Apr. 23, 2015 EP Comm.).
EP Communication dated Apr. 23, 2015 in Appln No. PCT/US2012/035710, 8 pgs.
Notice of Allowance dated Jun. 15, 2015, issued in U.S. Appl. No. 12/963,091, 28 pgs.
Office Action dated Jun. 26, 2015, issued in U.S. Appl. No. 13/096,854, 50 pgs.
Chinese Office Action and Search Report Issued in Chinese Patent Application No. 201280020368.3, dated Dec. 2, 2015, 14 pgs.
Chinese Office Action and Search Report Issued in Chinese Patent Application No. 201280020441.7, dated Dec. 15, 2015, 18 Pages.
Chinese Office Action and Search Report Issued in Patent Application No. 201280021905.6, dated Dec. 2, 2015, 14 pgs.
Chinese Office Action dated Dec. 29, 2015 in Appln No. 201280021954.x, 16 pgs.
Chinese Office Action dated Feb. 1, 2016 in Appln No. 201280020342.9, 12 pgs.
Chinese Office Action dated Mar. 4, 2016 in Appln No. 201280020430.9, 11 pgs.
European Office Action Issued in Application No. 12777397.6, dated Mar. 3, 2016, 6 pgs.
Japanese Office Action Issued in Patent Application No. 2014-508168, dated Mar. 23, 2016, 8 Pages.

(56) References Cited

OTHER PUBLICATIONS

Japanese Office Action Issued in Patent Application No. 2014-508169, dated Feb. 10, 2016, 11 Pages.
Japanese Office Action Issued in Patent Application No. 2014-508170, dated Mar. 22, 2016, 5 Pages.
Japanese Office Action Issued in Patent Application No. 2014-508171, dated Mar. 11, 2016, 6 Pages.
Taiwan Office Action and Search Report Issued in Taiwan Patent Application No. 101110617, dated Mar. 21, 2016, 6 Pages.
U.S. Appl. No. 13/096,854, Office Action dated May 2, 2016, 35 pgs.
U.S. Appl. No. 13/096,880, Office Action dated Feb. 19, 2016, 19 pgs.
U.S. Appl. No. 13/096,936, Office Action dated Mar. 22, 2016, 20 pgs.
U.S. Appl. No. 13/096,936, Office Action dated Nov. 23, 2015, 21 pgs.
U.S. Appl. No. 13/102,875, Office Action dated Apr. 20, 2016, 22 pgs.
U.S. Appl. No. 13/102,875, Office Action dated Sep. 21, 2015, 53 pgs.
U.S. Appl. No. 14/188,666, Office Action dated Feb. 26, 2016, 77 pgs.
Toyoko Abe et al.; "Object Bulletin Board for Group Cooperative Work" printed in a collection of papers (1997-2006 Version 1.1) presented at DICOMO symposium sponsored by Information Processing Society of Japan on Aug. 31, 2006 (pp. 513-518) (DVD-ROM), 8 pages.
Japanese Office Action Issued in Patent Application No. 2014-510384, dated May 9, 2016, 6 Pages.
Russian Office Action Issued in Patent Application No. 2013149178, dated May 20, 2016, 8 Pages. No English Translation.
Australian Office Action Full Examination Report Issued in Patent Application No. 2012253808, dated Jul. 9, 2016, 3 Pages.
Chinese Office Action Issued in Patent Application No. 201280021905.6, dated Jul. 1, 2016, With english translation. 10 pgs.
Japanese Notice of Allowance Issued in Patent Application No. 2014-508169, dated Jul. 12, 2016, 3 Pages. Without English Translation.
Japanese Office Action Issued in Patent Application No. 2014-510385, dated May 30, 2016, With English translation. 9 Pages.
Russian Office Action Issued in Patent Application No. 2013149178, dated May 20, 2016, With English Translation. 9 Pages.
U.S. Final Office Action dated Jun. 29, 2017 cited in U.S. Appl. No. 13/096,854, 40 pgs.
U.S. Final Office Action dated Jul. 5, 2017 cited in U.S. Appl. No. 13/102,875, 31 pgs.
Chinese Decision of Rejection dated Jun. 2, 2017 cited in Application No. 201280020441.7, 12 pgs.
U.S. Final Office Action dated Jun. 14, 2017 cited in U.S. Appl. No. 13/096,880, 13 pgs.
Office Action Issued in Chinese Patent Application No. 201280020342.9, dated Oct. 31, 2016, 11 Pages.
Office Action Issued in Chinese Patent Application No. 201280020368.3, dated Dec. 27, 2016, 10 Pages.
Office Action Issued in Chinese Patent Application No. 201280021905.6, dated Nov. 29, 2016, 11 Pages.
Second Office Action and Search Report Issued in Chinese Patent Application No. 201280020430.9, dated Nov. 1, 2016, 11 Pages.
JP: Office Action Issued in Japanese Patent Application No. 2014-508168, dated Oct. 7, 2016, 8 Pages.
JP: Notice of Allowance Issued in Japanese Patent Application No. 2014-508171, dated Aug. 4, 2016, 4 Pages.
AU: Office Action Issued in Australian Patent Application No. 2012253808, dated Sep. 16, 2016, 3 Pages.
U.S. Appl. No. 14/188,666, Office Action dated Oct. 25, 2016, 24 pgs.
U.S. Appl. No. 13/096,854, Office Action dated Jan. 11, 2017, 39 pgs.
U.S. Appl. No. 13/096,880, Office Action dated Oct. 25, 2016, 20 pgs.
U.S. Appl. No. 13/102,875, Office Action dated Nov. 14, 2016, 27 pgs.
Taiwan Office Action and Search Report Issued in Taiwan Patent Application No. 101110617, dated Jul. 26, 2016, 7 Pages.
Japanese Notice of Allowance Issued in Patent Application No. 2014-508170, dated Sep. 13, 2016, 3 Pages.
Third Office Action Issued in Chinese Patent Application No. 201280020441.7, dated Jan. 25, 2017, 10 Pages.
Chinese Office Action Issued in Patent Application No. 201280020342.9, dated Aug. 1, 2016, With English translation. 10 pages.
Chinese Second Office Action and Search Report Issued in Chinese Patent Application No. 201280020368.3, dated Aug. 5, 2016, 10 pages. With English Translation.
Chinese Second Office Action dated Aug. 29, 2016 in Application No. 201280021954.x, 5 pages.
Chinese Second Office Action Issued in Chinese Patent Application No. 201280020441.7, dated Aug. 1, 2016, 14 Pages. With English Translation.
European Office Action Issued in Application No. 12782951.3 , dated Aug. 17, 2016, 6 pages.
Japanese Notice of Allowance Issued in Patent Application No. 2014-508171, dated Aug. 4, 2016, 4 Pages.
U.S. Appl. No. 13/096,899, Office Action dated Sep. 26, 2016, 36 pages.
Japanese Office Action dated Oct. 13, 2016 cited in Application No. 2014-510384, 6 pgs.
Chinese Office Action dated Feb. 27, 2017 cited in Application No. 201280020430.9, 8 pgs.
"Office Action Issued in Korean Patent Application No. 10-2013-7028223", dated Jul. 17, 2018, 9 Pages.
"Office Action Issued In Korean Patent Application No. 10-2013-7028430", dated Jun. 28, 2018, 8 Pages.
"Final Office Action Issued in Korean Patent Application No. 10-2013-7029294", dated May 28, 2018, 05 Pages.
"Final Office Action Issued in U.S. Appl. No. 13/096,854", dated Jul. 23, 2018, 25 Pages.
"Office Action Issued In Canadian Patent Application No. 2,835,323", dated Sep. 17, 2018, 4 Pages.
U.S. Appl. No. 13/102,875, Office Action dated Mar. 16, 2018, 18 pages.
Chinese Decision on Reexamination in Application 201280020342.9, dated Mar. 30, 2018 15 pages.
Chinese Notice of Allowance in Application 201280021905.6, dated Mar. 27, 2018, 4 pages.
U.S. Appl. No. 14/853,098, Notice of Allowance dated May 31, 2018, 14 pages.
U.S. Appl. No. 14/887,086, Notice of Allowance dated Jun. 6, 2018, 7 pages.
U.S. Appl. No. 14/887,086, Office Action dated Oct. 6, 2017, 16 pages.
Chinese Notice of Allowance in Application 201280020430.9, dated Aug. 29, 2017, 4 pages.
Chinese Office Action in Application 201280021905.6, dated Sep. 19, 2017, 9 pages.
U.S. Appl. No. 14/853,098, Office Action dated Aug. 4, 2017, 12 pages.
Korean Office Action in Application 10-2013-7028430, dated Oct. 23, 2017, 11 pages.
Chinese Office Action in Application 201280020342.9, dated Sep. 29, 2017, 11 pages.
European Communication in Application 12777074.1, dated Oct. 16, 2017, 7 pages.
Korean Office Action in Application 10-2013-7028280, dated Oct. 21, 2017, 11 pages.
Chinese Office Action in Application 201280020368.3, dated Nov. 6, 2017, 10 pages.
Korean Office Action in Application 10-2013-7028277, dated Oct. 23, 2017, 11 pages.
Korean Office Action in Application 10-2013-7029294, dated Oct. 23, 2017, 10 pages.

(56) References Cited

OTHER PUBLICATIONS

Korean Office Action in Application 10-2013-7029310, dated Nov. 27, 2017, 7 pages.
U.S. Appl. No. 13/096,854, Office Action dated Dec. 28, 2017, 29 pages.
Re@DNotify, How to forward emails "As Attachments", Retrieved on Jul. 2, 2009 by the WayBack Machine, 7 pages.
European Office Action in Application 12777397.6, dated Jan. 3, 2018, 6 pages.
U.S. Appl. No. 14/887,086, Office Action dated Jan. 26, 2018, 19 pages.
Canadian Office Action in Application 2835323, dated Jan. 25, 2018, 4 pages.
Chinese Decision on Reexamination in Application 201280021905.6, dated Jan. 29, 2018, 14 pages. (No English Translation.).
European Summons in Application 12782951.3, mailed Feb. 13, 2018, 7 pages.
U.S. Appl. No. 14/853,098, Office Action dated Feb. 8, 2018, 11 pages.
"Office Action Issued in Korean Patent Application No. 10-2013-7028277", dated Jan. 21, 2019, 6 Pages.
"Oral Hearing Issued in European Patent Application No. 12777397.6", dated Jan. 16, 2019, 8 Pages.
"Office Action Issued in Korean Patent Application No. 10-2013-7028223", dated Dec. 24, 2018, 5 Pages.
"Final Office Action Issued in Korean Patent Application No. 10-2013-7028277", dated Nov. 19, 2018, 6 Pages.
"Notice of Allowance Issued in Korean Patent Application No. 10-2013-7028223", dated May 29, 2019, 3 Pages.
"Summons to Attend Oral Proceedings Issued in European Patent Application No. 12776501.4", Mailed Date: Dec. 13, 2018, 10 Pages.
"Final Office Action Issued in U.S. Appl. No. 16/238,456", dated May 29, 2020, 18 Pages.
"Non Final Office Action Issued in U.S. Appl. No. 16/238,456", dated Nov. 29, 2019, 16 Pages.
"Advisory Action Issued in U.S. Appl. No. 16/238,456", dated Aug. 4, 2020, 3 Pages.
"Non Final Office Action Issued in U.S. Appl. No. 16/238,456", dated Dec. 28, 2020, 19 Pages.
"First Office Action and Search Report Issued in Chinese Patent Application No. 201810697272.X", dated Jun. 8, 2021, 13 Pages.
"Office Action Issued in Indian Patent Application No. 8458/CHENP/2013", dated Oct. 30, 2019, 8 Pages.
"Second Office Action Issued in Chinese Patent Application No. 201810697272.X", dated Dec. 31, 2021, 6 Pages.

\* cited by examiner

STORING METADATA INSIDE FILE TO
REFERENCE SHARED VERSION OF FILE

BACKGROUND

When users send files that are attached to an electronic message, they create multiple copies of a given file. Not only does a copy of the attachment exist in each user's mailbox, the attachment is often stored in other locations as well. When a user replies with changes to the attachment they create yet another copy and version of the attachment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A link to a shared version of a local file is inserted into metadata of the local file. The local file may be a copy of a shared file and/or a local file that is designated to be shared. For example, when a local file is uploaded to a shared location for collaboration, a link to the shared location is automatically inserted into metadata of the local file. A local copy of a shared file may be created by downloading the shared file to a local data store. A link to the shared location is automatically inserted into the locally stored. When the local file is opened, the link within the metadata may be used to access the version of the local file at the shared location. Changes made to the local file and/or shared version of the file may also be synchronized.

DETAILED DESCRIPTION

Figure 1:
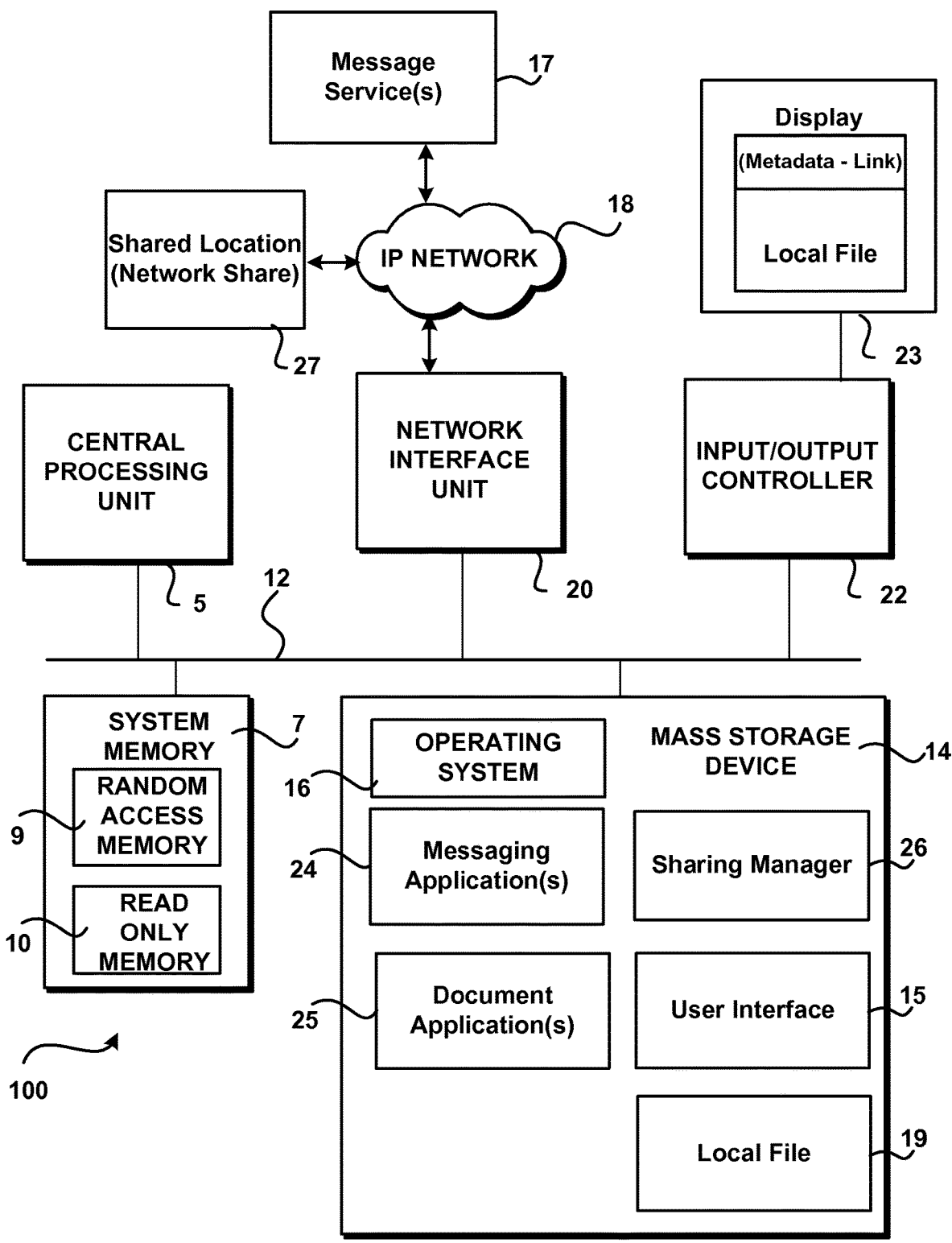
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, messaging application(s) 24, Document Application(s) 25, and sharing manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Washington. The mass storage device 14 and RAM 9 may also store one or more program modules. In particular, the mass storage device 14 and the RAM 9 may store one or more application programs, such as one or more messaging application(s) 24 and one or more document application(s) 25. Document application(s) 25 may be many different type of applications, such as a word processing application, a presentation application, a photo program, a spreadsheet application, and the like.

A user interface 15 is used by a user to interact with applications and files. Messaging application(s) 24 may be one or more different messaging applications. For example, computing device 100 may include an email application, an Instant Messaging (IM) application, an SMS, MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE or some other network based service.

Network share 27 is configured to store content (e.g. files, spreadsheets, Web content, and the like) that are accessible to one or more users through IP network 18. For example, network share 27 may store content that is accessible by users located at one or more locations.

Sharing manager 26 is configured to automatically insert a link to a file at a shared location in response to a local file being shared and/or a local version of a shared file being created. For example, in response to detecting when a local file, such as local file 19, is shared (e.g. at network share 27), sharing manager 26 inserts metadata into the local file that includes a link to shared version of the file at the shared location. Similarly, in response to a file at shared location 27 being downloaded and a local copy of the shared file being created, sharing manager 26 inserts metadata into the local copy of the shared file that includes a link to shared version of the file at the shared location. Sharing manager 26 may be located externally from an application, e.g. messaging application 24 or file application 25, as shown or may be a part of an application. Further, all/some of the functionality provided by sharing manager 26 may be located internally/externally from an application.

Sharing manager 26 is configured to insert metadata including a link within a local file. The term "link" refers to an address that represents a location of content. For example, a link may be in the form of a Uniform Resource Locator (URL) that specifies a network location of where the content is stored. Selecting the link generally retrieves the content that is pointed to by the link. Sharing manager 26 creates a link to the shared version of the local file at the shared location and inserts the metadata including the link into the local file. For example, when a local file is uploaded to a shared location for collaboration and/or downloaded to create a local copy of the shared file, sharing manager 26 automatically inserts the created link to the shared location and metadata into the local file. The local file that is uploaded/downloaded may be many different type of files (e.g. word processing documents, pictures, web content, spreadsheets, and the like). When the local file is opened, the link within the metadata may be used to retrieve the version of the local file at the shared location. Changes made to the local file and/or shared version of the file may also be synchronized. More details regarding the sharing manager are disclosed below.

Figure 2:
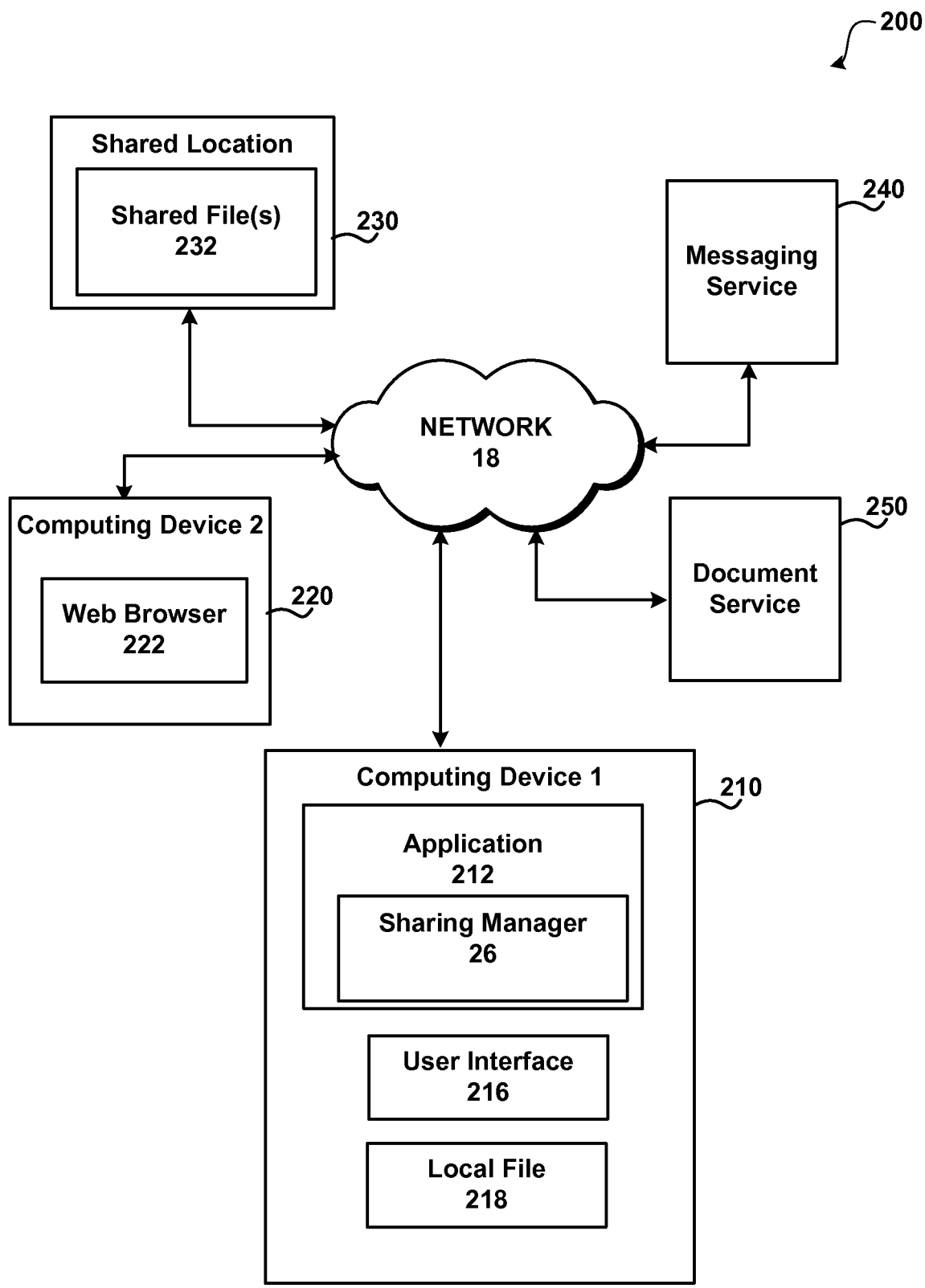
FIG. 2 shows a system for storing metadata inside a local file to reference a shared version of the local file.

FIG. 2 shows a system for storing metadata inside a local file to reference a shared version of the local file. As illustrated, system 200 includes computing device 1 (210), computing device 2 (220), shared location 230, messaging service 240 and document service 250.

The computing devices may be any type of computing device that is configured to perform the operations relating to sharing files. For example, some of the computing devices may be: mobile computing devices (e.g. cellular phones, tablets, smart phones, laptops, and the like); desktop computing devices and servers. Some computing devices may be arranged to provide an online service (e.g. messaging service 240 that is configured for sending and receiving electronic messages, a document service 250 that is configured for interacting with documents, and the like), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, network share 230, messaging service 240, and document service 250.

Computing device 1 includes application 212, user interface 216 and local file 218. As illustrated, computing device 1 is used by a user to interact with applications, local files that are stored local to computing device 1 and shared files that are stored in a shared location (e.g. shared file(s) 232).

User interface (UI) 216 is used to interact with applications and content, such as application 212 and shared files and/or local files. One or more user interfaces of one or more types may be used to interact with the content. For example, UI 216 may include the use of a context menu, a menu within a menu bar, a menu item selected from a ribbon user interface, a graphical menu, and the like. Generally, UI 216 is configured such that a user may easily interact with content. For example, a user may simply select an option within UI 216 to create a shared version of a local file (e.g. local file 218) at shared location 230. UI 216 may also be used to display information relating to shared files. For example, upon detection of a link to a shared file that is within metadata of a local file, UI 216 may display a selectable option to allow a user to view the shared version of the local file. UI 216 may also be used to set/change permissions that are to be associated with the shared attachment. For example, UI 216 may be used to change read/write permissions for one or more users of the shared document.

Application 212 may be a client based application, such as a document application, an email application, an Instant Messaging Application, a social media application, and the like. Generally, application 212 is used to share a local file at a shared location and interact with the local/shared files. A network based application, such as messaging service 240 and/or document service 250 may be used in addition to application 212 or instead of one or more of the applications. For example, a web interface may be used to access an online service, such as messaging service 240 and/or document service 250.

Messaging service 240 may be used to process electronic messages between one or more computing devices, such as computing device 1 and computing device 2. Messaging service 240 may be configured to process different message types, such as SMS, MMS, email, messages for social networks and the like. Messaging service 240 may be configured with the functionality of sharing manager 26 and one or more message types may be used to communicate the electronic messages including links to shared content that are related to attachments that were designated to be shared.

Document service 250 may by one or more computing devices, such as computing device 1 and computing device 2, to interact with documents, such as shared file(s) 232. Document service 250 may be configured to interact with one or more types of documents, such as word-processing documents, spreadsheet documents, photos, and the like. Document service 250 may be configured with the functionality of sharing manager 26.

Computing device 2 includes one or more applications, such as a web browser 222 that may be configured to access an online service, such as messaging service 240 and document service 250. For example, web browser 222 may be used to access an electronic message through an email messaging service and then access a shared version of a local file 232 stored at shared location 230.

One or more network shares (e.g. shared location 230) may be used to store shared file(s) that are shared between users and/or accessed remotely, such as attachments that were initially included within an electronic message and were selected to be shared and local files that were designated to be shared. The shared content may be any type of content that can be shared (e.g. files such as word processing documents, spreadsheets, slides, website content and the like). Shared location 230 is accessible by the computing devices that interact with the shared file(s) 232. The shared location may be associated with an online service that supports online access/interaction with content (e.g. messaging service 240, document service 250).

According to an embodiment, sharing manager 26 is configured to detect any attachments to an electronic message and to provide an option to automatically upload the attachments to a shared location and permission the attachments for sharing between users. The attachments may be to any type of content, such as word processing documents, spreadsheets, slides, website content and the like. Generally, the attachment may be to any type of content that is accessible by a computing device. Sharing manager 26 inserts metadata into the local file that is not uploaded that includes a link to the shared location.

Sharing manager 26 is also configured to present one or more selectable options that when selected open the shared file from shared location 230. For example, when local file 218 is opened that has metadata that includes a link to a shared version of the local file at shared location 230, an option may be displayed to a user that when selected opens up the shared version of the local file from the shared location 230.

Sharing manager 26 detects when a local file is uploaded to a shared location and/or when local version of a shared file is created (e.g. a shared file 232 is downloaded to computing device 1). In response to the local file being shared and/or a local copy of a shared file being created, sharing manager 26 creates a link to the shared version of the local file that is stored at the shared location. According to an embodiment, the link is a URL to the shared file. Sharing manager 26 inserts metadata including the link into the local file such that the local file remains associated with the shared version of the local file. The metadata may be placed at different locations within the local file. According to an embodiment, the metadata is inserted into a file header of the local file.

Sharing manager 26 may also be configured to automatically permission the file at the shared network location. The permissions to be set for a file may be predetermined. For example, all files that are shared may be initially set for read/write access or read access or write access. Permissions may be set based on the type of file (e.g. word processing documents may be set to read/write whereas photos or pictures may be set to read only). The default permissions may be set by a user. According to an embodiment, sharing manager 26 is configured to present an option to change the default permissions. For example, a user may select a change permissions option to modify the permissions for one or more of the files for one or more of the users.

Sharing manager 26 may also be configured to synchronize changes made to either the shared file at shared location 230 and/or changes made to the local file 218. For example, a user may make one or more changes to local file 218 while they are not connected to shared location 230. When connection is restored, sharing manager 26 may synchronize the changes to shared file 232 at shared location 230. According to an embodiment, a cached version of the shared file is stored locally in a cache and changes are applied to the cached version. The cached version of the shared file is synchronized with the version stored at the shared location.

Figure 3:
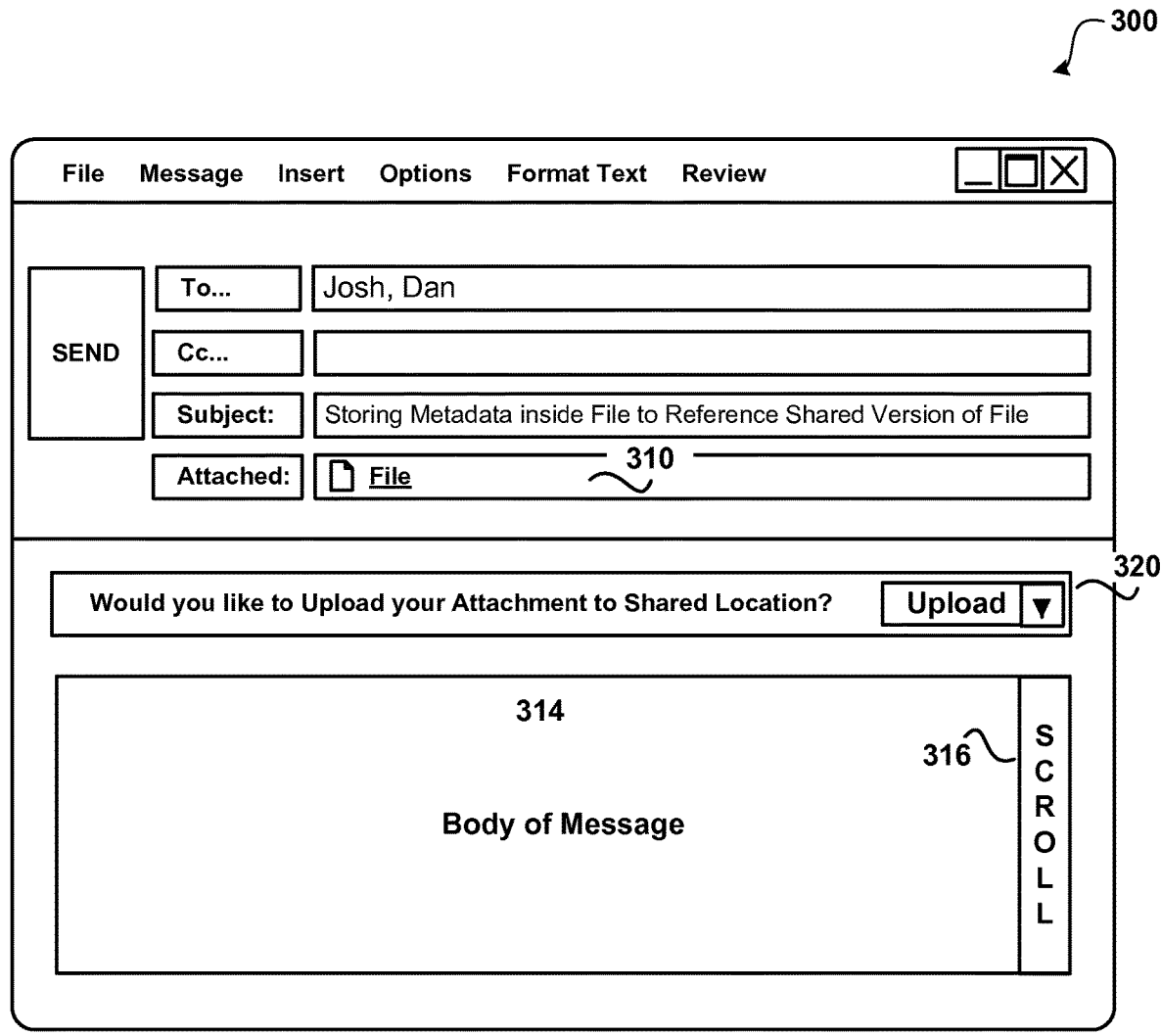
FIG. 3 shows a display of an electronic message including a attachment that is uploaded to a shared location.
Figure 3:
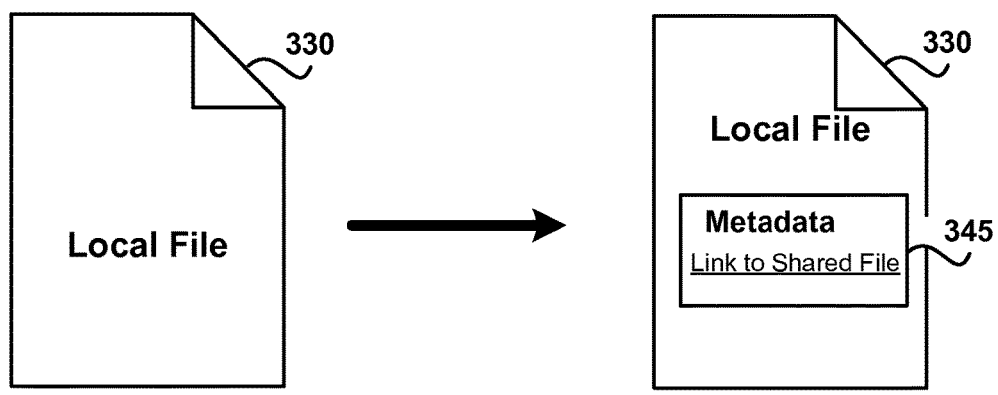
Figure 4:
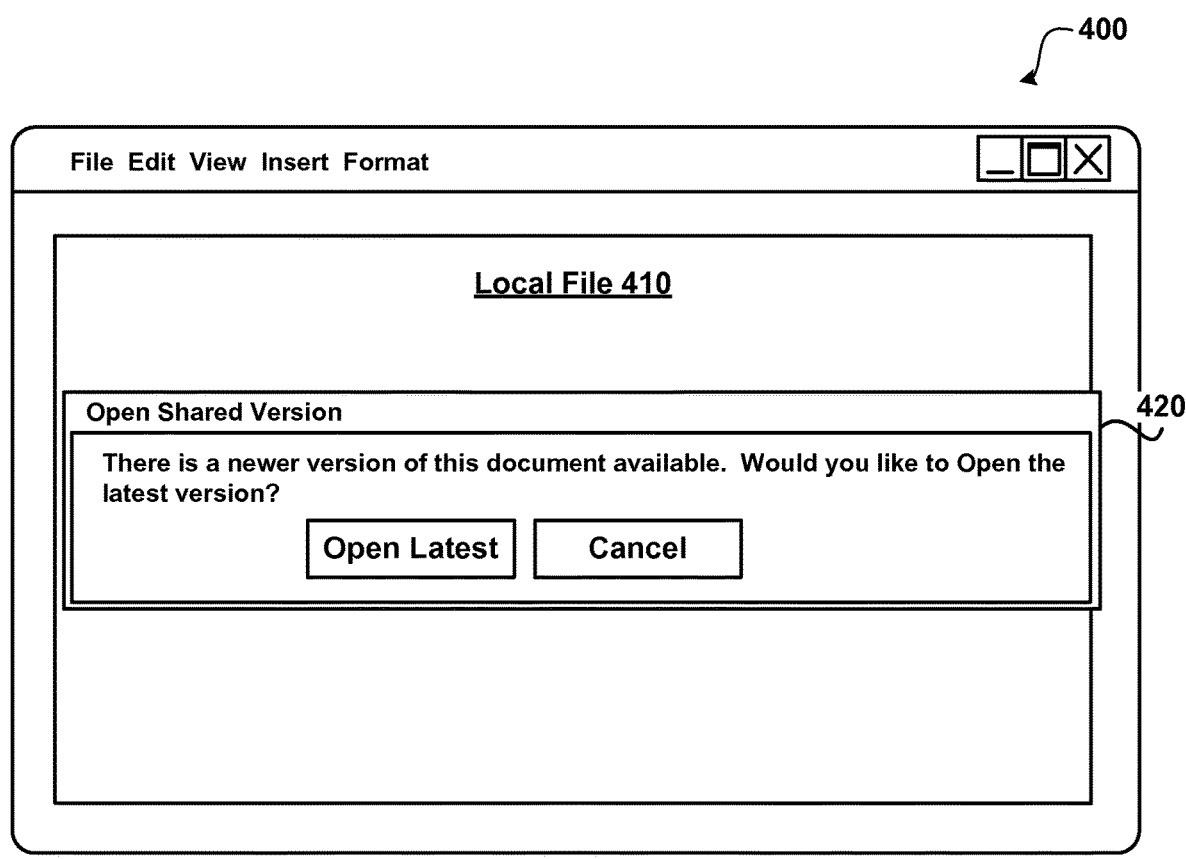
FIG. 4 shows a local file being opened that includes inserted metadata that includes a link to a shared version of the local file.

FIGS. 3-4 show examples of inserting metadata into a local file in response to sharing the local file and opening a shared version of the local file using the metadata. FIGS. 3-4 are for exemplary purpose and are not intended to be limiting.

FIG. 3 shows a display of an electronic message including a attachment that is uploaded to a shared location. As illustrated, message 300 comprises a To: field, a Cc: field, a Subject field, and a body of the message 314 and attachment file 310. More or fewer fields may be included with the electronic message.

The electronic message may be accessed a number of ways. For example, a web browser may access an electronic mail service, an email application on a computing device may be configured to receive emails from one or more different services, and the like.

When electronic message 300 is created and/or received, one or more files may be attached to the message. The attachments may be to any type of content, such as word processing documents, spreadsheets, slides, websites and the like.

When an attachment is detected for the electronic message, an upload option 320 may be presented with the display of electronic message 300. Upload option may include one or more options. For example, a single selectable option may be displayed to upload an attachment or one or more other options may be included in an upload option menu for setting other options (e.g. changing shared location, changing permissions, including attachment with/without link to shared content, and the like).

As illustrated, message 300 includes attached file 310 that is a copy of local file 330. In response to attached file being shared, local file 330 is updated to include metadata 345. Metadata 345 includes a link to the shared version of the local file that is uploaded to the shared location. According to an embodiment, each version of the local file has metadata inserted to include the link. In the current example, metadata 345 is inserted into both local file 330 and attached file 310. In this way, if either one of the local files (attached file 310, local file 330) is opened, the link in the metadata may be used to access the shared version of the local file.

FIG. 4 shows a local file being opened that includes inserted metadata that includes a link to a shared version of the local file.

As illustrated, document application window 400 shows local file 410 being opened by a document editing application (e.g. a word processing application). In response to opening local file 410, a determination is made as to whether local file is shared by accessing metadata within the local file. According to an embodiment, the metadata is stored within the header of the local file and includes a link to the shared version of the local file. User interface 420 may be displayed in response to different events and determinations. For example, user interface 420 may be displayed each time local file 410 is opened. User interface 420 may be displayed in response to a determination that a more recent version of the local file is stored at the shared location.

Figure 5:
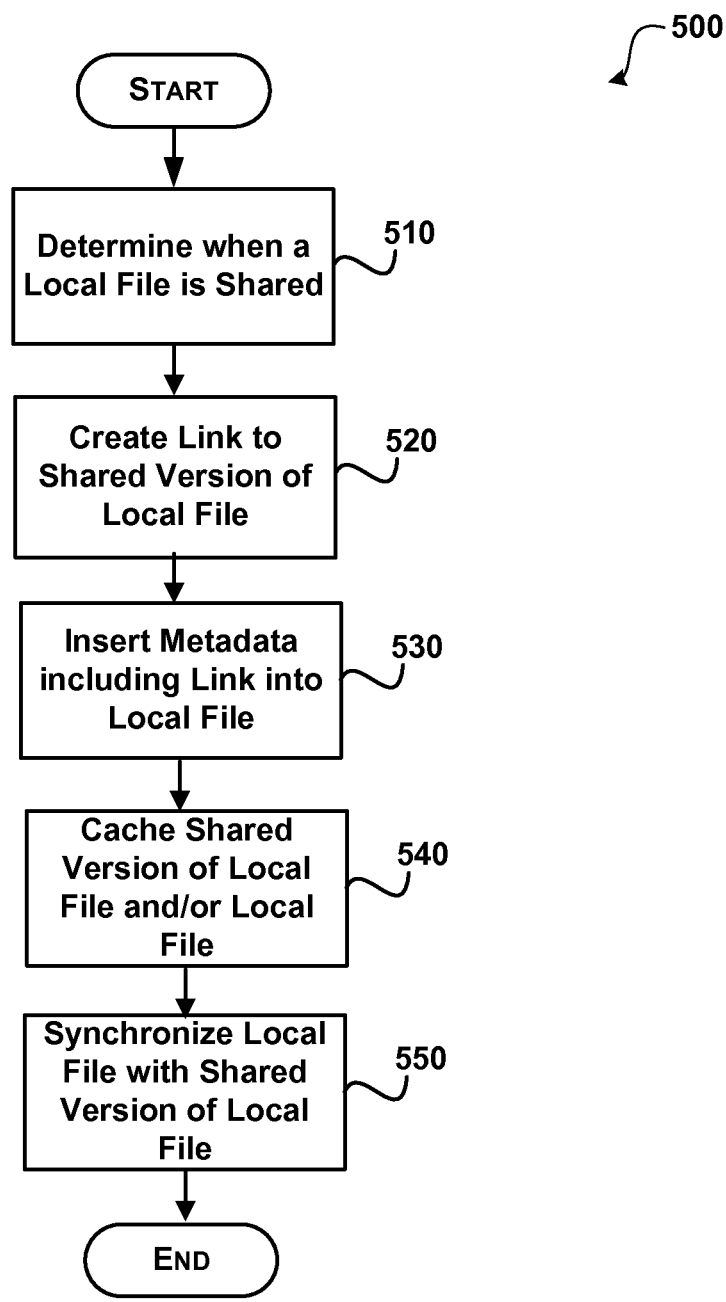
FIG. 5 shows a process for inserting metadata including a link to a shared location within a local file in response to the local file being shared.
Figure 6:
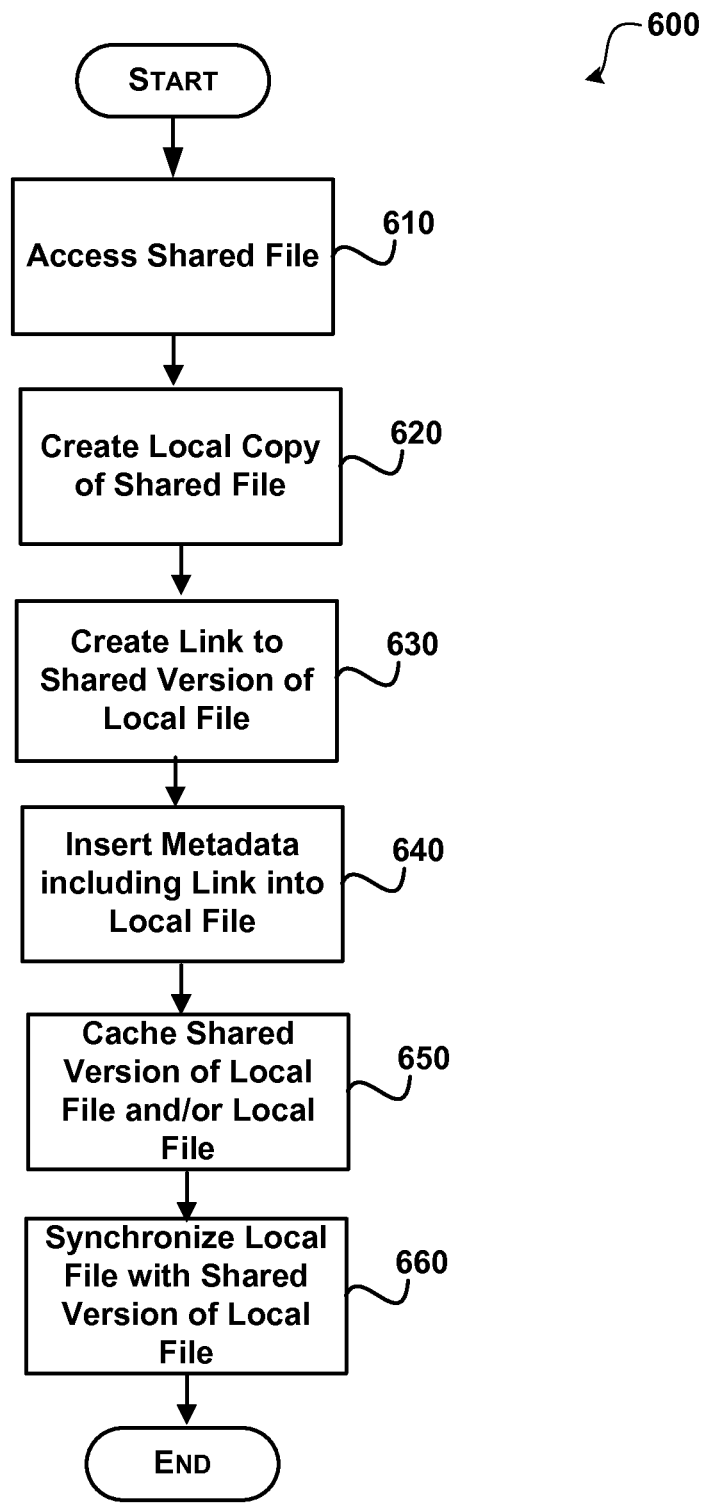
FIG. 6 shows a process for inserting metadata including a link to a shared location within a local copy of a shared file.
Figure 7:
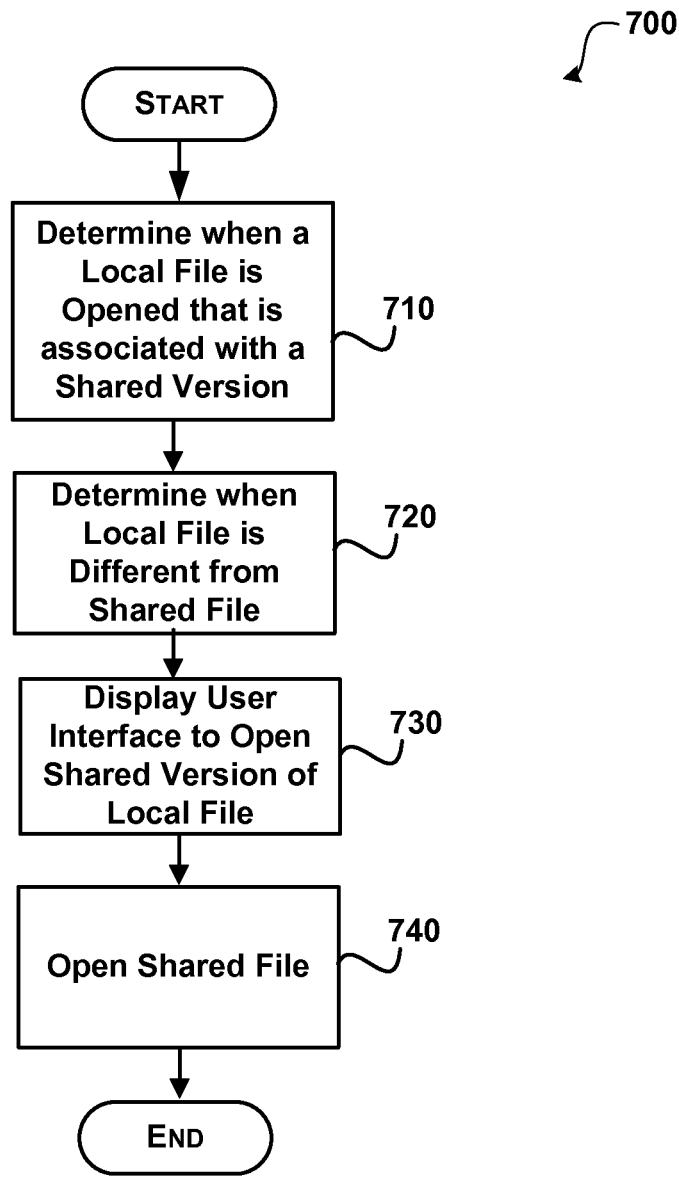
FIG. 7 illustrates a process for opening a shared version of a local file in response to opening the local file.

FIGS. 5-7 show illustrative processes for inserting metadata into a local file and using the metadata to access the shared version of the local file. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 5 shows a process for inserting metadata including a link to a shared location within a local file in response to the local file being shared.

After a start block, process 500 moves to operation 510, where a determination is made that a local file is shared. The determination may be made using different methods. For example, the determination that the local file is shared may be made in response to: a user selecting a sharing option relating to the local file; a search is performed in one or more shared locations for a shared version of the local file; a user may specify that a shared version of the local file exists, and the like.

Flowing to operation 520, a link to the shared version of the local file is created. According to an embodiment, the link is a URL to the shared version of the local file at the shared location.

Moving to operation 530, metadata is inserted into the local file. The metadata includes the link to the shared version and may include other information relating to the sharing of the local file (e.g. sharing permissions). According to an embodiment, the metadata is inserted into a header of the local file. The metadata may be stored in other ways. For example, a metadata store may be maintained that stores the metadata including the link separately from (but associated with) the local file.

Flowing to operation 540, a cached version of the local file may be optionally created. The cached version may be the shared version of the local file that is stored at the shared location and/or the cached version may be the local file that is stored locally. Instead of directly interacting with the shared version of the local file, the cached version may be accessed and changed.

Transitioning to operation 550, the local file may be synchronized with the shared version of the local file such that each version includes recent changes. According to an embodiment, the cached version of the local file is synchronized with the shared version at the shared location in response to network connectivity being restored to the shared location and/or in response to a user input requesting synchronization.

The process then flows to an end block and returns to processing other actions.

FIG. 6 shows a process for inserting metadata including a link to a shared location within a local copy of a shared file.

After a start block, process 600 moves to operation 610, where a shared file is accessed. The shared file may be accessed from a variety of locations such as a network share and/or some other network location.

Moving to operation 620, a local copy of the shared file is created. For example, a user may download a copy of the shared file to a local data store.

Flowing to operation 630, a link to the shared version of the local file is created. According to an embodiment, the link is a URL to the shared version of the local file at the shared location.

Moving to operation 640, metadata is inserted into the local file. The metadata includes the link to the shared version and may include other information relating to the sharing of the local file (e.g. sharing permissions). According to an embodiment, the metadata is inserted into a header of the local file. The metadata may be stored in other ways. For example, a metadata store may be maintained that stores the metadata including the link separately from (but associated with) the local file.

Flowing to operation 650, a cached version of the local file may be optionally created. The cached version may be the shared version of the local file that is stored at the shared location and/or the cached version may be the local file that is stored locally. Instead of directly interacting with the shared version of the local file, the cached version may be accessed and changed.

Transitioning to operation 660, the local file may be synchronized with the shared version of the local file such that each version includes recent changes. According to an embodiment, the cached version of the local file is synchronized with the shared version at the shared location in response to network connectivity being restored to the shared location and/or in response to a user input requesting synchronization.

The process then flows to an end block and returns to processing other actions.

FIG. 7 illustrates a process for opening a shared version of a local file in response to opening the local file.

After a start operation, process 700 flows to operation 710 where a determination is made that a local file is opened that is associated with a shared version. According to an embodiment, the local file is examined to determine whether or not the local file is associated with metadata that includes a link to a shared version of the local file.

Moving to operation 720, a determination may/may not be made to determine when the local file is different from the shared file (i.e. the shared version has been more recently updated). This determination may be used to determine when to display a user interface and/or when to perform a synchronization.

Transitioning to operation 730, a user interface may be displayed to open the shared version of the local file. For example, when the shared version of the local file is more recent than the local file, then the user interface may be displayed such that the user can access the shared version of the local file. The user interface may also be displayed whenever a local file is opened that is being shared. This helps to ensure that changes are made to a single instance of the file.

Flowing to operation 740, the shared file is opened when the user selects the option within the displayed user interface.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
    detecting that a copy of a local file stored at a first location is attached to an electronic message;
    in response to the detection, providing an upload option for display within the electronic message;
    in response to receiving a selection of the upload option, uploading and storing a shared version of the local file at a shared location;
    in response to storing the shared version of the local file at the shared location:
        creating a link comprising an address that represents a location of the shared version of the local file at the shared location; and
        inserting the link into metadata of the local file that is stored at the first location such that the link within the metadata of the local file is used to identify that the local file is shared and is used to access from the local file at the first location the shared version stored at the shared location; and
    in response to opening the local file after the link is inserted within the metadata and identifying that the local file is shared using the link, causing a user interface that includes a selectable option to be presented, the selectable option enabling a selection to open the shared version of the local file that, when selected, opens the shared version of the local file at the shared location using the link.

2. The method of claim 1, further comprising synchronizing the local file and the shared version of the local file when the shared version of the local file is different from the local file.

3. The method of claim 1, further comprising storing a cached version of the shared version of the local file within a cache such that when changes are made to the cached version, the changes are synchronized with the shared version of the local file.

4. The method of claim 1, wherein inserting the link into the metadata of the local file comprises inserting the link into the metadata in a file header of the local file.

5. The method of claim 1, wherein causing the user interface that includes the selectable option to be presented in response to opening the local file after the link is inserted within the metadata and identifying that the local file is shared using the link comprises:
    determining whether the shared version of the local file is a different, more recent version than the local file; and
    causing the user interface that includes the selectable option to be presented further in response to a determination that the shared version of the local file is a different, more recent version than the local file.

6. The method of claim 5, wherein the user interface further includes an indication that the shared version of the local file is a different, more recent version than the local file.

7. Computer storage memory storing computer-executable instructions for:
    detecting that a copy of a local file stored at a first location is attached to an electronic message;
    in response to the detection, providing an upload option for display within the electronic message;
    in response to receiving a selection of the upload option, uploading and storing a shared version of the local file at a shared location;
    in response to storing the shared version of the local file at the shared location:
        creating a link comprising an address that represents a location of the shared version of the local file at the shared location; and
        inserting the link into metadata of the local file that is stored at the first location such that the link within the metadata of the local file is used to identify that the local file is shared and is used to access from the local file at the first location the shared version stored at the shared location; and
    in response to opening the local file after the link is inserted within the metadata and identifying that the local file is shared using the link, causing a user interface that includes a selectable option to be presented, the selectable option enabling a selection to open the shared version of the local file that, when selected, opens the shared version of the local file at the shared location using the link.

8. The computer storage memory of claim 7, wherein a second file is stored at the shared location, and in response to the second file being downloaded to a local data store associated with the first location:
    creating a link comprising an address that represents a location of the second file at the shared location; and
    inserting the link into the metadata of the second file.

9. The computer storage memory of claim 7, further storing instructions for synchronizing the local file and the shared version of the local file when the shared version is different from the local file.

10. The computer storage memory of claim 7, further storing instructions for storing a cached version of the shared version of the local file.

11. The computer storage memory of claim 7, wherein inserting the link into the metadata of the local file comprises inserting the link within the metadata in a file header of the local file.

12. The computer storage memory of claim 7, wherein the instructions for uploading and storing the shared version of the local file at the shared location comprises:
    automatically setting one or more permissions for the shared version of the local file stored at the shared location; and
    providing a change permissions option to enable modification of the one or more permissions.

13. A system comprising:
    a processor; and
    a memory coupled to the processor and storing computer-readable instructions that, when executed by the processor, cause the processor to:
        in response to a local file being stored at a first location and a shared version of the local file being uploaded and stored at a shared location, create a link comprising an address that represents a location of the shared version of the local file at the shared location, the shared version of the local file being uploaded and stored in response to detecting that a copy of the local file is attached to an electronic message and receiving a selection of an upload option provided for display within the electronic message upon the detection;

insert the link into metadata of the local file, wherein the link indicates that the local file is shared and is used to access from the local file at the first location the shared version of the local file at the shared location; and in response to opening the local file after the link is inserted within the metadata and identifying that the local file is shared using the link, cause a display of a user interface that includes a selectable option, the selectable option enabling a selection to open the shared version of the local file that, when selected, opens the shared version of the local file at the shared location using the link, wherein the user interface further includes an indication that a different version of the local file exists at the shared location when the shared version of the local file differs from the local file.

14. The system of claim 13, wherein the memory stores further computer-readable instructions that, when executed by the processor, cause the processor to synchronize the local file and the shared version of the local file.

15. The system of claim 13, wherein a second file is stored at the shared location that is downloaded to a local data store associated with the first location for storage, and the memory stores further computer-readable instructions that, when executed by the processor, cause the processor to:

in response to the second file being downloaded to the local data store associated with the first location:
create a link comprising an address that represents a location of the second file at the shared location; and
insert the link into the metadata of the second file downloaded and stored to the local data store.

16. The system of claim 13, wherein the local file is stored at the first location on a computing device, and the shared version of the local file is stored at the shared location on a network share remote from and accessible by a plurality of computing devices including the computing device.

17. A method comprising:

storing a local file at a first location on a computing device;

detecting that the local file is attached to an electronic message as an attachment in response to the detection, providing an upload option for display within the electronic message to automatically upload the local file to the shared location; and in response to receiving a selection of the upload option, upload the local file for storage as a shared version of the local file at a shared location on a network share remote from and accessible by a plurality of computing devices including the computing device;

creating a link comprising an address that represents a location of the shared version of the local file at the shared location;

inserting the link into metadata of the local file that is stored at the first location on the computing device such that the link within the metadata of the local file is used to identify that the local file is shared and is used to access from the local file at the first location the shared version stored at the shared location; and in response to opening the local file on the computing device after the link is inserted within the metadata and identifying that the local file is shared using the link, causing a user interface that includes a selectable option to be presented, the selectable option enabling a selection to open the shared version of the local file that, when selected, opens the shared version of the local file at the shared location on the network share using the link.

18. The method of claim 17, further comprising synchronizing the local file and the shared version of the local file when the shared version of the local file is different from the local file.

19. The method of claim 17, further comprising storing a cached version of the shared version of the local file within a cache such that when changes are made to the cached version, the changes are synchronized with the shared version of the local file.

20. The method of claim 17, wherein inserting the link into the metadata of the local file comprises inserting the link into the metadata in a file header of the local file.

* * * * *